United States Patent [19]

Pittman

[11] Patent Number: 4,601,205
[45] Date of Patent: Jul. 22, 1986

[54] LINEAR ACCELERATION COMPENSATION FOR MULTISENSOR

[75] Inventor: Roland Pittman, Montclair, N.J.

[73] Assignee: The Singer Company, Little Falls, N.J.

[21] Appl. No.: 672,560

[22] Filed: Nov. 19, 1984

[51] Int. Cl.⁴ .............................................. G01P 15/09
[52] U.S. Cl. ......................................... 73/505; 73/510
[58] Field of Search ........................... 73/505, 510, 504

[56] References Cited

U.S. PATENT DOCUMENTS

| | | | |
|---|---|---|---|
| 3,362,229 | 1/1968 | Trueblood | 73/505 |
| 3,375,722 | 4/1968 | Riordan | 73/504 |
| 4,197,737 | 4/1980 | Pittman | 73/178 R |
| 4,457,173 | 7/1984 | Hunter | 73/510 |
| 4,462,254 | 7/1984 | Rider | 73/510 |

Primary Examiner—Stephen A. Kreitman
Assistant Examiner—Scott M. Oldham
Attorney, Agent, or Firm—Thomas W. Kennedy

[57] ABSTRACT

An angular velocity sensing device having a pair of bendable piezoelectric crystal members encounters undesirable effects due to linear acceleration. To buck out the sensing device signal component representing this effect, a compensating device having its own piezoelectric bendable crystal is mounted to the same spin axis shaft as the angular velocity device, in fixed offset relationship thereto, so that it generates a buck out signal in phase with the undesired signal component from the angular velocity sensing device.

7 Claims, 12 Drawing Figures

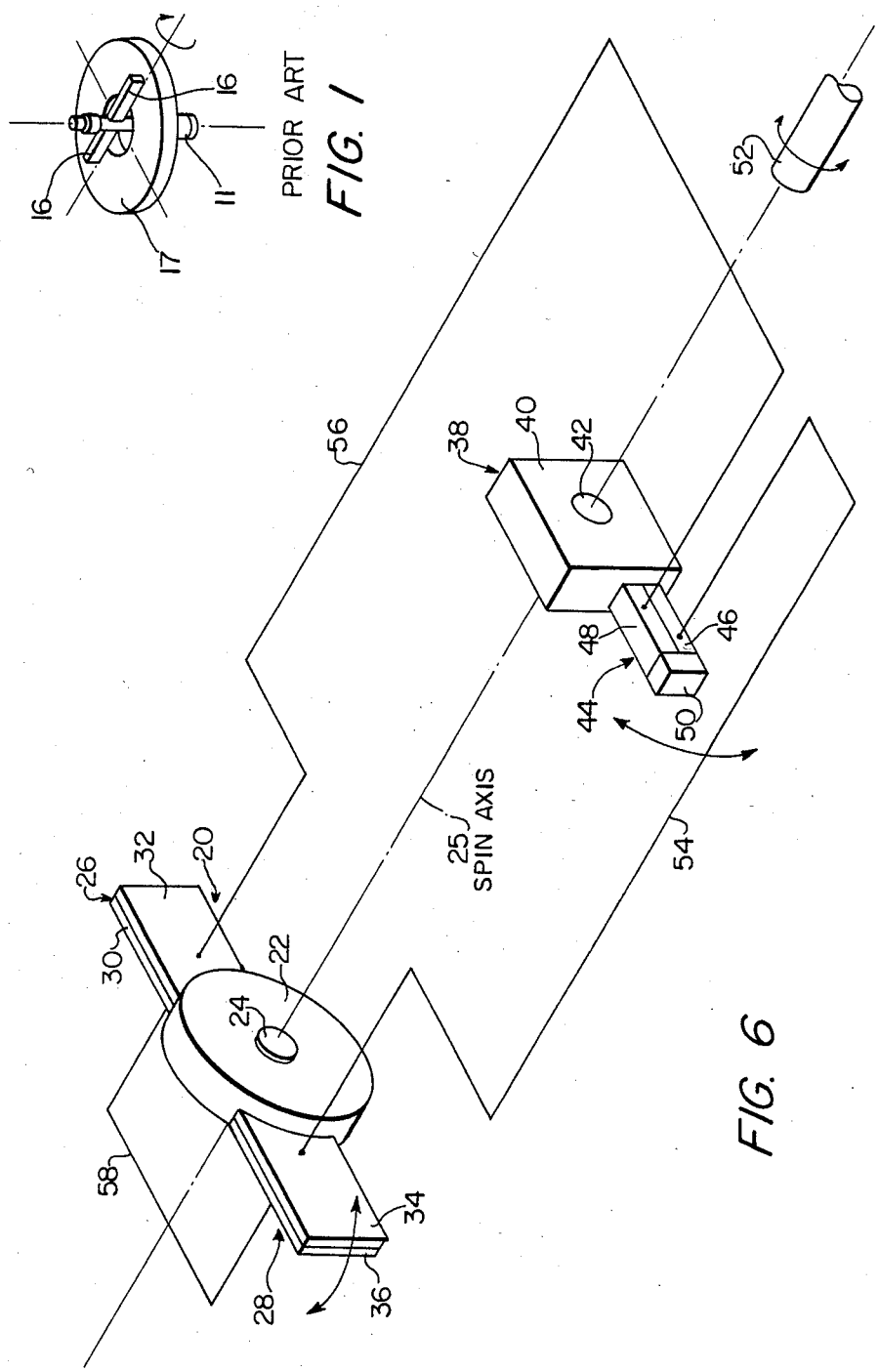

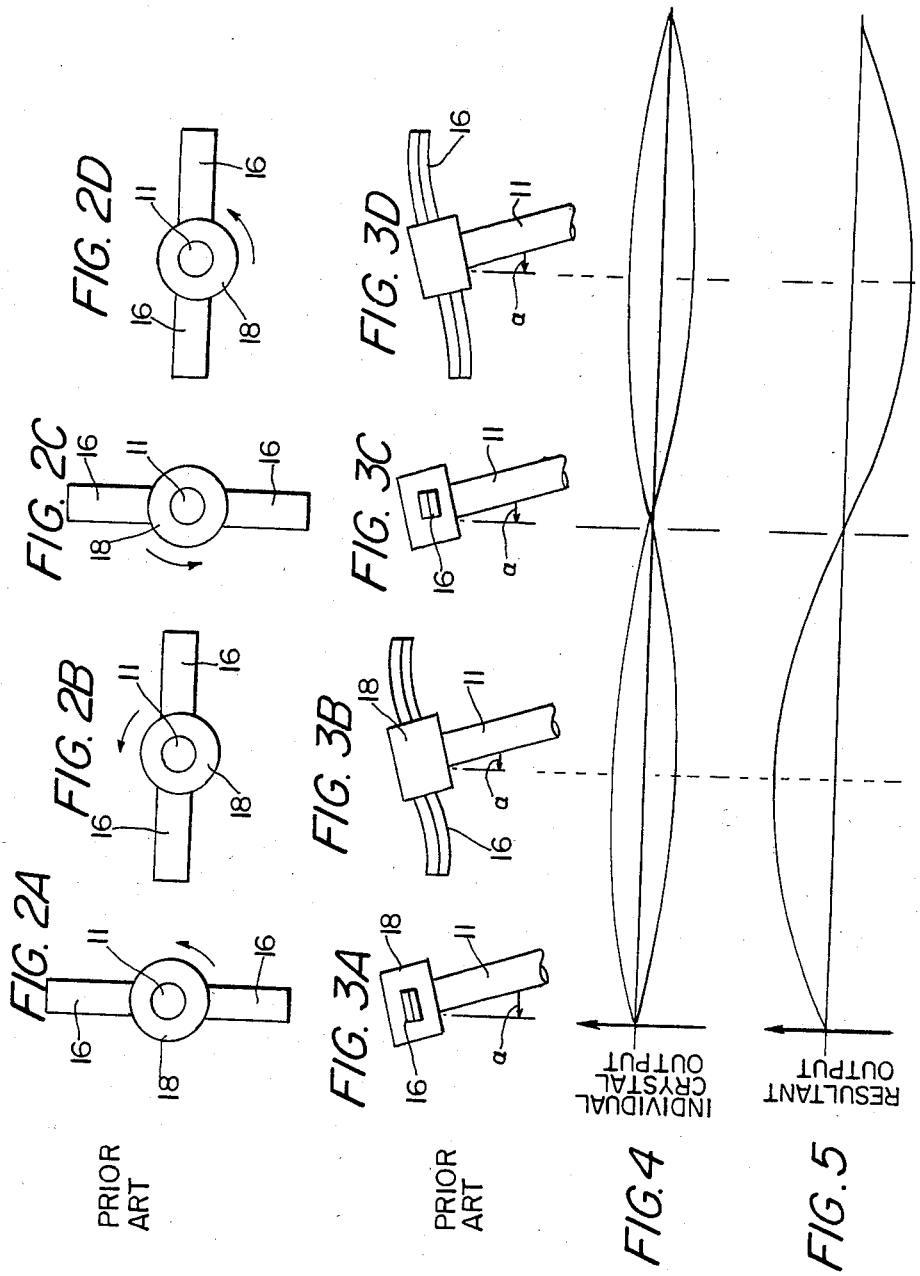

4,601,205

LINEAR ACCELERATION COMPENSATION FOR MULTISENSOR

FIELD OF THE INVENTION

The present invention relates to aircraft navigational systems, and more particularly to an improved angular velocity sensing device which compensates for the effect of linear acceleration.

BACKGROUND OF THE INVENTION

U.S. Pat. No. 4,197,737, issued Apr. 15, 1980, to the present inventor, is related to a sensing device for sensing such parameters as the magnetic field, electric field, gas flow, linear acceleration and angular acceleration. The patented device is particularly directed to aircraft. Briefly, the patented device included a number of individual sensing units mounted for rotation on a common shaft, and commutator means are connected to enable coupling of the sensed voltage from the sensing device. The individual units are adapted to produce alternating voltage signals, the instantaneous maximum amplitudes of the signals corresponding generally to the vector of the measured physical characteristic in a given plane, such as a plane normal to the axis of rotation. As a consequence, substantially complete data regarding the physical characteristics may be provided by employing the sensing units.

Angular velocity about axes normal to the shaft are detected by a pair of crystals extending radially from the shaft and having bending axes normal to the shaft. With respect to the prior art device, it has been found that linear acceleration produces unwanted effects on the angular velocity pick-up unit. One approach to rid output signals from these unwanted effects required a number of slip rings and isolation amplifiers to bring signals to signal conditioners for mixing. In addition, it was previously necessary to provide a two-phase pick-off array to properly sense linear acceleration. Accordingly, it has previously been necessary to provide compensation for linear acceleration at a system level which becomes costly and adds a reliability factor to the unit.

BRIEF DESCRIPTION OF THE PRESENT INVENTION

The advantage of the present invention over the latter-mentioned compensation scheme is to introduce compensation at the sensor level, rather than at the system level. In accordance with this objective, piezoelectric rate beams are arranged as a dipole and spun at a high speed around a spin axis. In response to angular velocity about any axis orthogonal to the spin axis, a dynamic output is obtained which generates an electrical signal proportional to the angular velocity input. The effects of linear acceleration are coupled to the crystal beams which generate an unwanted output component from the beams. To compensate for this, the present invention is directed to the addition of a compensating piezoelectric beam which is mechanically and electrically connected to the piezoelectric angular velocity beams. The sensitive axis of the additional (compensating) beam is arranged with its sensitive axis to fully couple the effects of linear acceleration to the piezoelectric angular velocity beams. A signal from the compensating beam is scaled and phased and subsequently added to the signal of the angular velocity sensor to buck out the unwanted response to linear acceleration.

BRIEF DESCRIPTION OF THE FIGURES

The above-mentioned objects and advantages of the present invention will be more clearly understood when considered in conjunction with the accompanying drawings, in which:

FIG. 1 is a simplified illustration of a prior art angular velocity sensing device;

FIGS. 2A–2D are views illustrating, in simplified form, four consecutive positions of the sensing rotor of the device shown in FIG. 1.

FIGS. 3A–3D are figures illustrating consecutively the side views corresponding to the views of FIGS. 2A–2D, respectively;

FIG. 4 illustrates the output of the two crystals of the device shown in FIGS. 2A–2D and 3A–3D;

FIG. 5 illustrates the sum of the voltages generated as illustrated in FIG. 4;

FIG. 6 is a disassembled view of a compensated angular velocity sensing device in accordance with the present invention.

DETAILED DESCRIPTION OF THE INVENTION

A prior art angular velocity probe is shown which is disclosed in my earlier mentioned patent. In FIG. 1 two crystals 16 are also mounted on opposite sides of the shaft 11 and bendable around bending axes normal to the axis of shaft 11. If desired, a reaction mass such as annular mass 17 may be provided symmetrically at the radially outer ends of the crystals. The arrangement constitutes an angular velocity probe based upon the gyroscopic operation of an elastically restrained body rotating at high velocity. The two bender crystals are arranged in a dipole fashion for common mode rejection and inertial balance. Angular momentum of the masses reacting as a result of an applied angular velocity at right angles to the spin axis of shaft 11, results in the generation of a voltage by the crystals which is sinusoidal in distribution and exhibits a frequency identical to the rate of rotation of the shaft.

The operation of the rate gyro of FIG. 1 may be more readily understood with reference to FIGS. 2A–2D which represent four consecutive positions of the crystals, with counterclockwise revolution, as may be seen from the end of the shaft 11. The shaft is assumed to be continuously rotating. Referring to FIGS. 3A–3D, which depict side views of the device shown in corresponding FIGS. 2A–2D, it is assumed that the axis of the shaft 11 has been displaced through an angle alpha. The shaft 11 and the hub 18 on the shaft in which the crystals 16 are mounted are adequately rigid so that they both may substantially instantaneously exhibit their new position without deformation. The radially outer ends of the crystals, however, due to gyroscopic action, remain for some time oriented as though the angular displacement of the shaft 11 had not occurred. This is, of course, particularly true if a reaction mass is linked to the radially outer ends of the crystals. As a consequence of the gyroscopic action, the crystals bend about their mechanical axes, as illustrated in FIGS. 3A–3D, to result in output voltages as illustrated in FIG. 4. It is thus seen that the instantaneous peaks of the resultant alternating voltage occur when the crystals extend normal to the axis of rotation about the angle alpha. Since the outputs of the crystals are of different polarity, the crystals are interconnected in reverse senses, to produce the resultant output voltage as illustrated in FIG. 5.

In the arrangement of FIGS. 1-5, it is apparent that the crystals are employed as gyroscopic elements, with or without the provision of a reaction mass, and that the strain on the crystals is proportional to input angular rate. The amplitude of the output is proportional to the input angular rate, and the phase of the output is related to the direction of the input angular rate of the rotating shaft in a direction normal to the axis of the shaft. In other words, if the shaft 11 is angularly displaced about an axis in the X/Y plane, the output of the rate gyro or angular velocity sensor of FIG. 1 is proportional to the rate of rotation about the axis in the X/Y plane, then the phase of the output voltage is related to the orientation of the axis of rotation in the X/Y plane, assuming that the shaft 11 extends in the Z direction.

FIG. 6 illustrates the improved angular velocity sensing device with means for compensating for the effects of linear acceleration.

The basic angular velocity sensing device generally indicated by reference numeral 20 is quite similar to the angular velocity sensing device just discussed in connection with FIGS. 1, 2A-2D, and 3A-3D. A central hub 22 of the device has a central bore 24 formed therein which is coaxial with the spin axis 25. Two bendable piezoelectric crystals 26 and 28 extend radially outwardly from hub 22 and serve the same function as bendable crystals 16 in connection with the previously discussed figures of the prior art. Bendable crystal 26 is composed of piezoelectric crystal elements 30 and 32 while crystal 28 is composed of piezoelectric crystal elements 34 and 36. As indicated by the directional arrow, the bendable crystals 26 and 28 deflect in a plane coincident with spin axis 25. The improvement of the present invention, namely the linear acceleration compensation device 38, reduces the unwanted effect of linear acceleration on the output from the angular velocity sensing device 20 which is electrically connected to the bendable crystals of the device 38 so as to buck out the effects of linear acceleration as will be explained hereinafter.

The compensation device 38 includes a central block 40, made of a suitable material such as ceramic, having a bore 42 therein coaxial with the spin axis 25. A bendable piezoelectric crystal 44, comprising crystal elements 46 and 48, extends in a direction orthogonal to the spin axis 25. As indicated by the directional arrows, the bendable crystal 44 of the compensation device 38 deflects in a plane perpendicular to spin axis 25. A shaft 52 is suitably received within bores 24 and 42 of the sensing device 20 and the compensation device 38, respectively, for mounting the devices on a common spin axis.

Due to the orientation of the compensation device bendable crystal 44, it does not significantly respond to angular velocity but is completely responsive to linear acceleration. By properly positioning the compensation device 38 on shaft 52, a unique angular offset is obtainable for generating a signal, in response to linear acceleration, which has the same phase as the linear acceleration signal generated by the angular velocity sensing device 20. The actual orientation of the bendable crystal 44, relative to bendable crystals 26 and 28 is a matter of trial and error due to the minute imperfections of the piezoelectric crystal material as compared with ideally formed crystal structures. An adjustable weight element 50 extends at the outward end of the bendable crystal 44 so that a bucking amplitude may be obtained which matches that of the linear acceleration effect. The weight element 50 may be made from solder and by adding or removing solder from the end of the bendable crystal 44 a precise bucking amplitude from the compensation device 38 may be obtained.

In order for compensation device 38 to operate in a compensating bucking mode, it must be electrically connected to the piezoelectric bendable crystals of the angular velocity sensing device 20. Thus, wire 54 is connected between crystal element 34 of sensing device 20 and crystal element 46 of compensation device 38. Similarly, wire 56 is connected between crystal element 32 of sensing device 20 and crystal element 48 of compensation device 38. A jumper wire 58 is connected between crystal elements 36 and 30 of the angular velocity sensing device 20.

When assembling the compensated structure of FIG. 6, the compensation device 38 is rotated on shaft 52 until a precise buck out phase is achieved. Thereafter, the central block 40 is secured to hub 22 of the sensing device 20 by means of an appropriate adhesive epoxy. Alternate fastening may be achieved if shaft 52 is threaded so that device 38 may be freely rotated relative to the spin axis and then secured to the angular velocity sensing device 20 when the fastener is screwed tightly.

Accordingly, the present invention offers an improved angular velocity probe to compensate for the effects of linear acceleration thereon. The compensation device 38 as just discussed generates a signal which is scaled and phased and added to the signal of the angular velocity sensing device 20 so as to buck out the unwanted response to linear acceleration. Accordingly, the present compensation is performed at the sensor level rather than relying upon external signal processing to accomplish the compensation.

It should be understood that the invention is not limited to the exact details of construction shown and described herein for obvious modifications will occur to persons skilled in the art.

I claim:

1. A compensated angular velocity sensing device comprising:
   a first section, including:
   (a) a hub coaxial with a spin axis;
   (b) at least one pair of piezoelectric bendable crystal members extending radially outwardly from the hub for generating a composite signal, including a desired component corresponding to angular velocity about the spin axis and an undesired component relating to linear acceleration;
   a second section, including:
   (c) a central body coaxial with the spin axis;
   (d) a third piezoelectric bendable crystal member extending outwardly from the central body for developing a signal corresponding to linear acceleration;
   (e) wires interconnecting the three crystal bendable members for bucking out the effects of linear acceleration;
   (f) means mounting the first and second sections in coaxial spaced coupled relation wherein the third crystal member is adjustably angularly positioned relative to the pair of crystal members for adjusting the phase of the second section signal; and (g) adjustable weight means connected to an outer end of the third bendable crystal member for determining the amplitude of the signal obtained from the third bendable crystal member.

2. The structure set forth in claim 1 wherein the mounting means comprises a threaded fastener received within central apertures formed in the hub and the central body enabling angular adjustment of the sections during assembly and fixed securement therebetween after assembly.

3. The structure set forth in claim 1 wherein the mounting means comprises a fastener received within central apertures formed in the hub and the central body enabling angular adjustment of the sections during assembly and fixed securement therebetween after assembly.

4. A method for compensating for the linear acceleration component of a signal generated by an angular velocity sensing device comprising a hub rotating about a spin axis and having first and second pieeoelectric bendable crystal members extending radially therefrom, the method including the steps:

mounting a third bendable piezoelectric crystal member in coaxial spaced coupled relation with the hub for generating a signal indicative of the effect of linear acceleration;

interconnecting the first, second, and third piezoelectric crystal members for bucking out the linear acceleration component of the signal generated by the first and second bendable piezoelectric crystal members; and adding weight to the third bendable crystal until the amplitude of linear acceleration signal derived therefrom is at a level sufficient to buck out the undesired linear acceleration signal from the first and second crystal members.

5. The method set forth in claim 4 together with the step of adjusting the angular orientation of the third bendable crystal relative to that of the first and second bendable crystal members until the phase of the linear acceleration signal derived therefrom substantially matches that of the first and second crystal members.

6. The method set forth in claim 4 together with the step of periodically adjusting the angular orientation of the third bendable crystal member relative to that of the first and second bendable crystal members so that the phase of the linear acceleration signal derived therefrom substantially matches that of the first and second crystal members.

7. A compensated angular velocity sensing device comprising:

a first section, including:
(a) a hub coaxial with a spin axis;
(b) at least one pair of piezoelectric bendable crystal members extending radially outwardly from the hub for generating a composite signal, including a desired component corresponding to angular velocity about the spin axis and an undesired component relating to linear acceleration;

a second section, including:
(c) a central body coaxial with the spin axis;
(d) a third piezoelectric bendable crystal member extending outwardly from the central body for developing a signal corresponding to linear acceleration;
(e) wires interconnecting the three crystal bendable members for bucking out the effects of linear acceleration;
(f) means mounting the first and second sections in coaxial spaced coupled relation, wherein the third crystal member is adjustable angularly positioned relative to the pair of crystal members for adjusting the phase of the second section signal; and
(g) means for adjusting the weight of the outer end of the third bendable crystal member for determining the amplitude of the signal obtained from the third bendable crystal member.

* * * * *